US010565638B2

(12) United States Patent
Karthikeyan

(10) Patent No.: US 10,565,638 B2
(45) Date of Patent: Feb. 18, 2020

(54) SELECTIVELY SHARED ACCOUNT ACCESS

(71) Applicant: INTERNATIONAL BUSINESS MACHINES CORPORATION, Armonk, NY (US)

(72) Inventor: Sailatha Karthikeyan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 15/222,310

(22) Filed: Jul. 28, 2016

(65) Prior Publication Data

US 2018/0033072 A1  Feb. 1, 2018

(51) Int. Cl.
*G06Q 30/06* (2012.01)
*H04L 29/08* (2006.01)

(52) U.S. Cl.
CPC ......... *G06Q 30/0633* (2013.01); *H04L 67/02* (2013.01)

(58) Field of Classification Search
CPC .......... G06Q 30/06–0645; G06Q 50/01; H04L 63/104; H04L 67/02; H04L 2463/102
See application file for complete search history.

(56) References Cited

U.S. PATENT DOCUMENTS

| 6,611,814 | B1 * | 8/2003 | Lee | G06Q 30/02 |
| | | | | 705/26.1 |
| 8,396,891 | B2 * | 3/2013 | Tsao | B66C 1/422 |
| | | | | 707/781 |
| 9,342,852 | B1 * | 5/2016 | Nagaraj | G06Q 50/01 |
| 2009/0055285 | A1 * | 2/2009 | Law | G06Q 30/02 |
| | | | | 705/26.35 |
| 2009/0055291 | A1 * | 2/2009 | Ho | G06Q 30/02 |
| | | | | 705/26.8 |
| 2009/0216653 | A1 | 8/2009 | Sanguinetti et al. | |

(Continued)

OTHER PUBLICATIONS

Seung-yun Kim, Jian Zhu, W. W. Smari and W. K. McQuay, "Security and Access Control for a Human-centric Collaborative Commerce System," International Symposium on Collaborative Technologies and Systems (CTS'06), Las Vegas, NV, 2006, pp. 429-439. (Year: 2006).*

(Continued)

*Primary Examiner* — Adam L Levine
(74) *Attorney, Agent, or Firm* — Schmeiser, Olsen & Watts, LLP; Isaac Gooshaw

(57) ABSTRACT

Tools, methods and computer systems for selectively sharing access to personalized user accounts containing account specific consumer information, between one or more different user accounts maintained by an e-commerce merchant. Upon accessing the user's own personalized account, users may request and approve the sharing of account data, with one or more approved user accounts hosted by the e-commerce merchant, wherein the shared account data may include personalized information such as the user's browsing history, order history, saved wish lists, product reviews, name, shipping address, etc. The tools, methods and systems of the disclosure may seamlessly display shared information in a specified section of the merchant's e-commerce website, such as a specific tab, widget or window and allow for users to make purchases on their own account for other users, using the shared account information to influence the decision of making the purchase.

9 Claims, 6 Drawing Sheets

(56) References Cited

U.S. PATENT DOCUMENTS

2013/0036025 A1     2/2013   Pottier et al.
2016/0019624 A1     1/2016   McBryer et al.

OTHER PUBLICATIONS

Andrei Iancu, "Remarks by Director Iancu at the Intellectual Property Owners Association 46th Annual Meeting", Sep. 24, 2018, Chicago, Illinois, retrieved on Nov. 18, 2018 from the Internet: <https://www.uspto.gov/about-us/news-updates/remarks-director-iancu-intellectual-property-owners-46th-annual-meeting>, 7 pages.

* cited by examiner

US 10,565,638 B2

SELECTIVELY SHARED ACCOUNT ACCESS

TECHNICAL FIELD

The present disclosure relates generally to systems, methods and tools for providing selective access to view shared user account information.

BACKGROUND

E-commerce and online accessible storefronts allow for a quick and convenient way for businesses to create, gather, store and disseminate information about the users and customers that visit e-commerce merchants, websites, applications and services. Many users and customers visit websites operated by e-commerce merchants and vendors to view or purchase products or services. The information about each user's experience through the website, application or service is often collected, organized and stored into manageable data structures, such as a customer or user profile. The stored information can be accessed or recalled at a subsequent time by the customer or the business operating the e-commerce storefront. Organization and management of a user's browsing, viewing and purchasing habits provide a great deal of information about each particular user's interests, needs and past activities in order to predict future user behavior.

In recent years, there has been an increasing trend of using electronic shopping basket applications and/or wish list applications to provide a user of a website, application or service with a mechanism that temporarily stores selected items (e.g., goods, services, and/or offers) prior to purchasing these items electronically. Typically, these applications, services and websites reside on a Web server of the merchant or shopping web page and are limited to use only on that particular web page. A user can visit the merchant's web page and/or shopping portal and temporarily store items of interest in an electronic itemized list. The electronic item list can then be reviewed or e-mailed to a third party, such as a friend or family member, so that the third party may purchase these items for the user as a gift. The electronic item list can also be a temporary storage for the user, until the user decides to make a purchase of that item at a later time.

SUMMARY

A first embodiment of the present disclosure provides a method for accessing content of a shared account comprising the steps of accessing, by a computer processor, an account controlled by a user; requesting, by the computer processor, permission to view the shared account controlled by a second user while simultaneously accessing the account of the user; receiving, by the computer processor, permission to access and display shared account data; further receiving, by the computer processor, the shared account data; and displaying, by the computer processor, account data associated with the account controlled by the user and shared account data associated with the shared account, wherein the shared account data is displayed as a subsection of the account controlled by the user.

A second embodiment of the present disclosure provides a computer system, comprising: a processor; a memory device coupled to the processor; and a computer readable storage device coupled to the processor, wherein the storage device contains program code executable by the processor via the memory device to implement a method for accessing content of a shared account comprising the steps of: accessing, by a computer processor, an account controlled by a user; requesting, by the computer processor, permission to view the shared account controlled by a second user while simultaneously accessing the account of the user; receiving, by the computer processor, permission to access and display shared account data; further receiving, by the computer processor, the shared account data; and displaying, by the computer processor, account data associated with the account controlled by the user and shared account data associated with the shared account, wherein the shared account data is displayed as a subsection of the account controlled by the user.

A third embodiment of the present disclosure provides a computer program product comprising: one or more computer readable hardware storage devices having computer readable program code stored therein, said program code containing instructions executable by the one or more computer processors to implement a method for accessing content of a shared account comprising the steps of: accessing, by a computer processor, an account controlled by a user; requesting, by the computer processor, permission to view the shared account controlled by a second user while simultaneously accessing the account of the user; receiving, by the computer processor, permission to access and display shared account data; further receiving, by the computer processor, the shared account data; and displaying, by the computer processor, account data associated with the account controlled by the user and shared account data associated with the shared account, wherein the shared account data is displayed as a subsection of the account controlled by the user.

DETAILED DESCRIPTION

Overview

Figure 1:
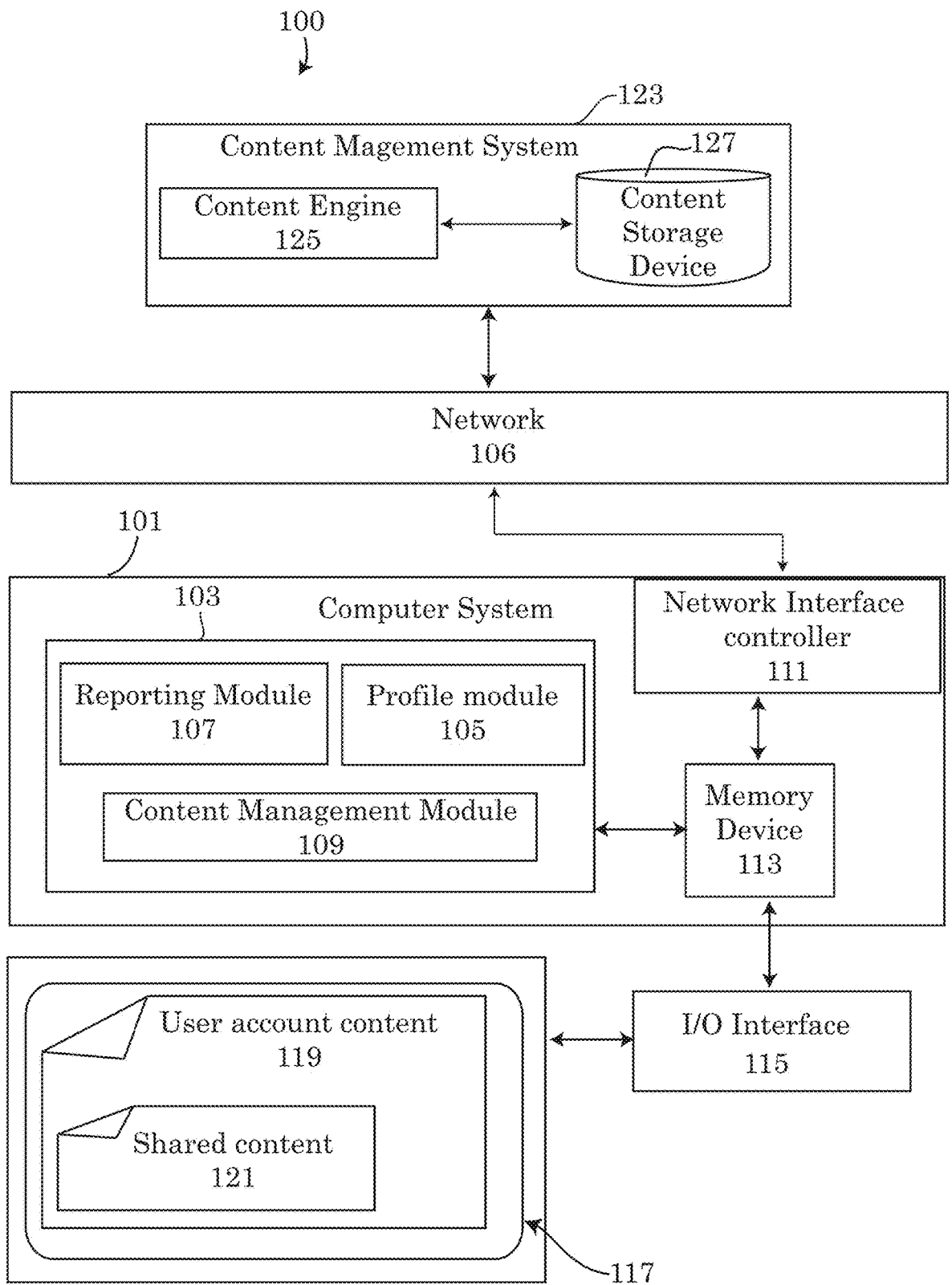
FIG. 1 depicts a block diagram of an embodiment of a system for selectively accessing a shared account.

Embodiments of the present disclosure recognize that user accounts and profiles stored by e-commerce merchants and other web sites, applications and services, are specific to the user currently accessing the content of provided by the merchant or web site. Personalized information tracked by e-commerce merchants or website can influence the future content presented, viewed or accessed by a user. For example, tracking a user's browsing history, order history, reviews, comments, product selections or bookmarked selections set aside for later purchases, may allow for the e-commerce merchant or website to subsequently suggest future products, services or additional content to the user that may be of particular interest. The suggestions however, are uniquely personalized to the user account currently accessing the e-commerce store or website and may not be relevant, accessible or dynamically viewable by others.

A user may not always be seeking content or engaging in e-commerce for themselves when accessing an e-commerce store, website or application. Often, users accessing e-commerce merchants or other websites, applications and services, engage in e-commerce activities for the purpose of benefiting another individual. For example, shopping for a gift. Unfortunately, e-commerce merchants, websites and applications that engage in tracking users only track personalized information about the user currently accessing content of the e-commerce merchant or web site. The e-commerce merchants do not provide the same amount of specific details to the current user regarding a separate and distinctly different user, not currently accessing the available content.

The inaccessible, personalized user information, relating to the non-accessing users could provide the current accessing user with a wealth of information that may allow for the engagement of e-commerce or content selection in a manner befitting of the tastes and interests of the non-accessing user. For example, by assisting the accessing user to find a perfect gift or specialized pieces of content predicted to be desirable to the non-accessing user. Thus, there is a need for systems, tools and methods that allow for selectively sharing and accessing personalized content or information stored by websites and e-commerce merchants without compromising the security of each of the users' accounts during the sharing process.

Embodiments of the present disclosure are directed toward systems, tools and methods for selectively sharing access to the personalized user-account information collected and stored by e-commerce merchants, websites and application with additional accounts unassociated with the collected data. Sharing personalized account information stored by e-commerce or other websites, applications and services, allows users to dynamically access detailed information that may be able to assist users with making decisions based on the preferences and interests of the sharing users, including detailed information that may normally only be viewable while logged into a sharing user's own account.

In some embodiments, an individual user accessing an e-commerce merchant, website, application or service, may enter the merchant's portal by accessing the user's own personalized account information. For example, by logging in with a personalized username and account password, providing a security token, entering a pin number or answering security questions with preset answers or providing biometric information such as fingerprint scans, retinal scans or facial recognition scans. Upon accessing the user's own personalized account, the user may view personalized information relating to the user's personalized account profile, including the user's browsing history, order history, saved wish lists, product reviews, comments, notations, name, shipping address, payment information, etc.

Subsequently, while still accessing the user's own personalized account profile, the user may simultaneously request access to personalized account information of another user (referred to as the "sharing user"). For example, the user making the request for access to the personalized information of the sharing user, may make a friend request or verify the user's own identity to the sharing user in order to confirm that the sharing user would like to grant the user access to the sharing user's personalized information, including browsing histories, order history, wish lists, merchant suggestions, shipping information, etc. In some embodiments, the sharing user may restrict the particular types of personalized or stored information is viewable to the user making the request for access. Embodiments of the present disclosure may allow for the sharing user to restrict the viewership of the sharing user's personalized information to a specific set time limit, terminate the access at any time or the sharing user may revoke access to the personalized information automatically once the requesting user exits or closes the e-commerce merchant's store or web site.

Upon granting the requesting user's request to access the shared user's personalized account information, the requesting user may access both the requesting user's own personalized account information and the sharing user's account information from the requesting user's account. For example, when the user accesses the user's account by entering the merchant's electronic storefront or another website, the user may view or display content associated with the user's own personalized preferences, including browsing history, product review, wish lists, order history which may include valuable information for preferences and sizing, and content suggestions made by the merchant or other website. The user accessing the user's account may also view or display, in a subsection of the user's account, content being shared by the sharing user's account.

The shared content may be displayed in a specified section of the merchant's e-commerce website, such as a specific tab, widget or window which may be specifically identified as content derived from the sharing user's personalized information, preferences and viewing habits. The user may proceed to browse and view the shared content from the user's account, in a same or similar manner as if the user had logged into the sharing user's account. In some embodiments however, certain types of content that the sharing user has restricted may not appear or be viewable to the user accessing the shared content. In some embodiments, the user may select items or services for purchase while viewing the subsection of the merchant website directed toward the shared content. Upon selecting items for purchase, the items may appear in the user's digital shopping cart until checkout, wherein at the time of checkout, the user may purchase the items from the user's account. In some embodiments, the merchant's e-commerce website may denote the purchase as a gift for another user or a purchase made using shared content provided by a sharing user.

System for Selectively Accessing Shared Account Information

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Referring to the drawings, FIG. 1 depicts a block diagram of an embodiment of an account sharing system 100 that may be used for accessing content of a shared user account from a separate user account. Embodiments of the sharing system 100 may include a computer system 101 which may include each of the components of the computer system 500 as defined in FIG. 5 of this disclosure and defined further below. Components integrated into the computer system 101 may include a processor 591, memory devices 594, 595, input device 592, output device 593, computer code 597 loaded within the memory device 595, and input data 596 received by the computer system 101 which may be transmitted by one or more input devices 592 connected to the computer system 101.

In one or more embodiments of the account sharing system, the computer system 101 may include an account sharing module 103. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device 113 of the computer system 101. A module (whether hardware, software, or a combination thereof) may be designed to implement or execute one or more particular functions or routines.

Embodiments of the account sharing module 103 may include one or more components of hardware and/or software program code loaded into memory device 113, for connecting the computing system 101 to an e-commerce merchant, website (hereinafter collectively "merchant"). The merchant's storefront may be hosted by a content management system 123 storing all the information presented by the merchant. The content management system 123 may provide and approve to each a user account hosted or stored by the merchant, requests for permission to access and view personalized account data of a sharing user and control the display of each sharing user's personalized account data on the computer system 101. Embodiments of the account sharing module 103 may include a profile module 105, reporting module 107 and content management module 109

Embodiments of the profile module 105 may include hardware components and/or software program cod loaded in the memory device 113 of the computer system 103. The profile module 105 may make one or more permission requests to an e-commerce merchant or other website in order to access one or more different user account profiles stored by the content management system 123 of the merchant. The profile module 105 may initiate a connection between the computer system 101 and the merchant's content management system 123, which in some embodiments may be another computing system such as a web server. A connection to the merchant's content management system 123 may be established via a network 106.

Embodiments of the account sharing module 103 may be equipped with physical or virtual hardware capable of establishing the remote connection to a network 106. As depicted in FIG. 1, computer system 101 may be connected to the network 106 using a network interface controller 111. The network interface controller 111 may also be referred to as a network interface card, network adapter, or physical network interface. The network interface controller 111 may include physical electronic circuitry or a virtual controller that provides a base for a full network protocol stack, allowing communication between groups of computer systems, for example systems 101, 123 sharing the network 106. The network 106 may be for example a local area network (LAN) or a wide area network (WAN). The computing system 101 may use the network interface controller 111 to communicate with network 106 using a physical layer or virtual layer and a data link layer such as Ethernet, Fiber, Wi-Fi or a token ring.

Using the established network 106 between the computing system 101 and the content management system 123 of the merchant, the computer system 101 may make a request to access account profile information of the user currently accessing computer system 101. In some embodiments, the computer system 101 may further make a request using a protocol such as HTTP, TCIP, UDP, peer to peer (P2P) or other established protocol to gain access to both a user account and receive permission to access the content of a shared account stored by the content management system 123. In some embodiments, the profile module 103 may store login keys, tokens, registration credentials or authorize handshaking between the computer system 101 and content management 123 in order to gain access to the content of the logged in user account profile as well as the shared account data of the shared user account.

In some embodiments, the profile module 105 may also enforce the restrictive permissions set by the content management system 123 and/or the sharing user, including the enforcement of restrictions to a particular type of shared account data and/or enforcement of time restricted permissions to access shared account data. In an alternative embodiment, the content engine 125 of the content management system 123 may enforce validations of shared account permissions and enforce restrictions imposed by the sharing user on the computer system 101.

In some embodiments of the account sharing system 100, the account sharing module 103 may further comprise a content management module 109. The content management module 109 may be hardware components and/or software programming code stored in the memory device 113 of the computer system 101. The content management module 109 may be capable of requesting and retrieving the merchant's content from the content management system 123 for display by the computer system 101. The content management module 109 may transmit requests via network 106 to the content management system 123 for the retrieval of content stored by one or more content storage devices 127 of the content management system 123. In response to the requests transmitted by the content management module 109, a content engine 125 of the content management system 123 may fulfill the received requests by delivering the requested content stored by the content storage device 127. The content management system may fulfill the requests by transmitting the requested data from the content management system 123 via network 106 back to computer system 101.

In some embodiments, the content management module 109 and profile module may operate in tandem to request different data sets of content stored by the content management system. The content requested may be tied to one or more different user profiles, therefore the profile module 105 may validate to the content management system 123 that the request of the content management module 109, for a particular set of data stored by a shared user account, is a valid request and that the content management module 109's request should be fulfilled by the content engine 125. For example, upon accessing the merchant's website on the network 106, the profile module may request access to the user's account profile and subsequently access to the account profile of a sharing user. If the access is granted by the content management system 123 of the e-commerce merchant, the content management system 123 may retrieve the permitted content from the content storage device 127 that specifically corresponds to the current user's account profile and/or the shared account profile.

Embodiments of the account sharing module 103 may further include a hardware based and/or software based reporting module 107, which may be loaded in the memory device 113 of the computer system 101. The reporting module 107 may perform the task of organizing the content retrieved by the content management module 109 and displaying the content associated with the user account 119 (hereinafter "user account content 119"). Additionally, when the user account also has permission to access a sharing account, the reporting module 107 may further display the content associated with the shared account (hereinafter "shared content 121"). For example, in some embodiments, the user account content 119 and shared account content 121 may be displayed on an output device 117, such as a monitor or screen connected to the computer system 101 via an input/output (I/O) interface 115.

The reporting module 107, in some embodiments, may present the shared content 121 as a subsection of the user account content. For example, the shared content 121 presented by the reporting module 107, via the output device 117 may display the shared content 121 as a separate section, widget or window of the merchant website, service or application. In other embodiments, the shared content 121 may be integrated within the user account content 119. The shared content 121 may be designated or labelled in a particular manner identifying the shared content 121 separately from the user account content 119. For example, The shared content 121, such as browsing history, search history, order history, previously viewed products, product reviews, and wish lists, may be identified by a username of the sharing user labelling the content currently viewed or a color-coded identifier.

Figure 3A:
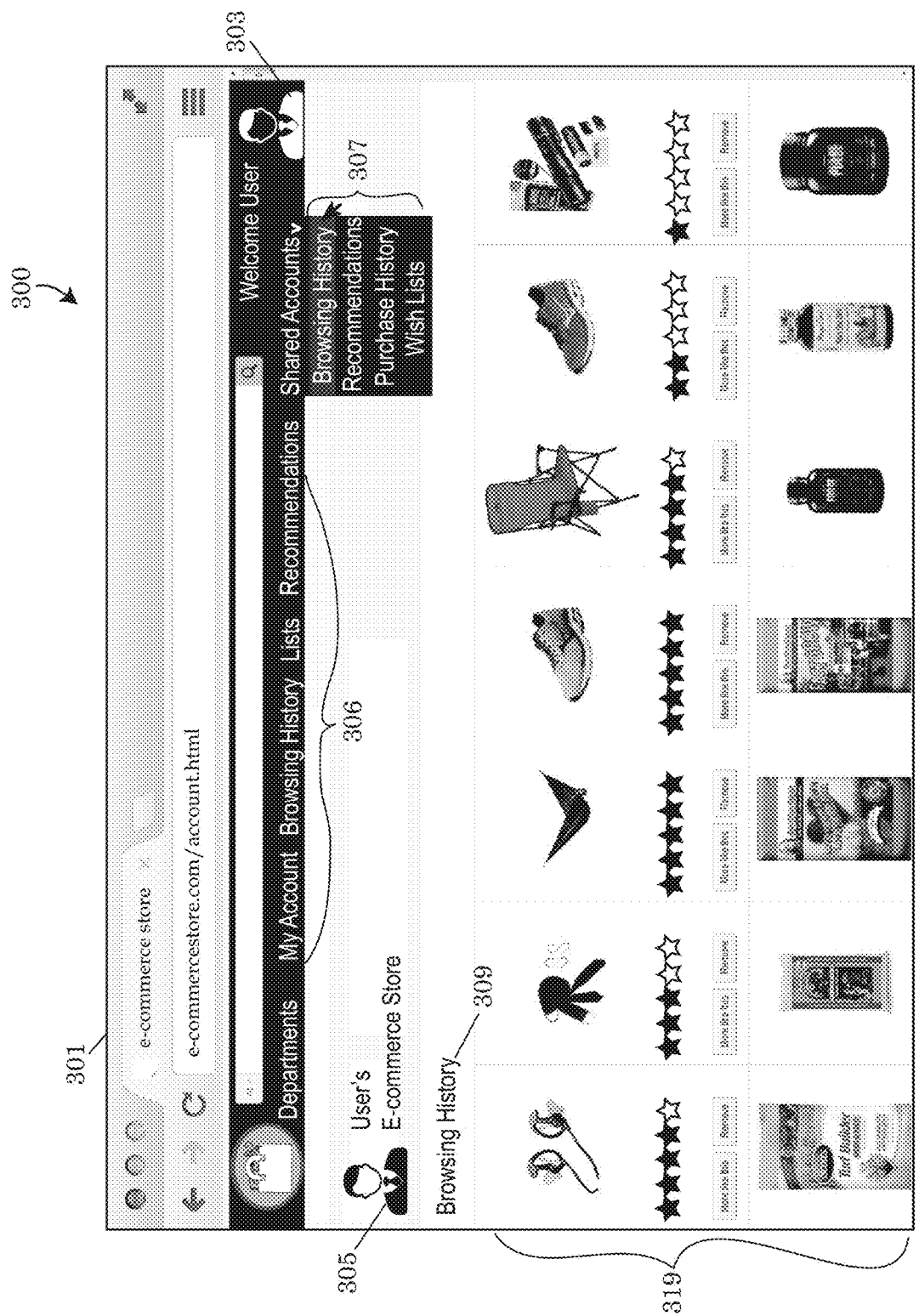
FIG. 3a depicts an embodiment of an interface for selectively accessing a shared account.
Figure 3B:
FIG. 3b depicts an embodiment of an interface displaying a selectively accessed shared account from a user account.
Figure 4:
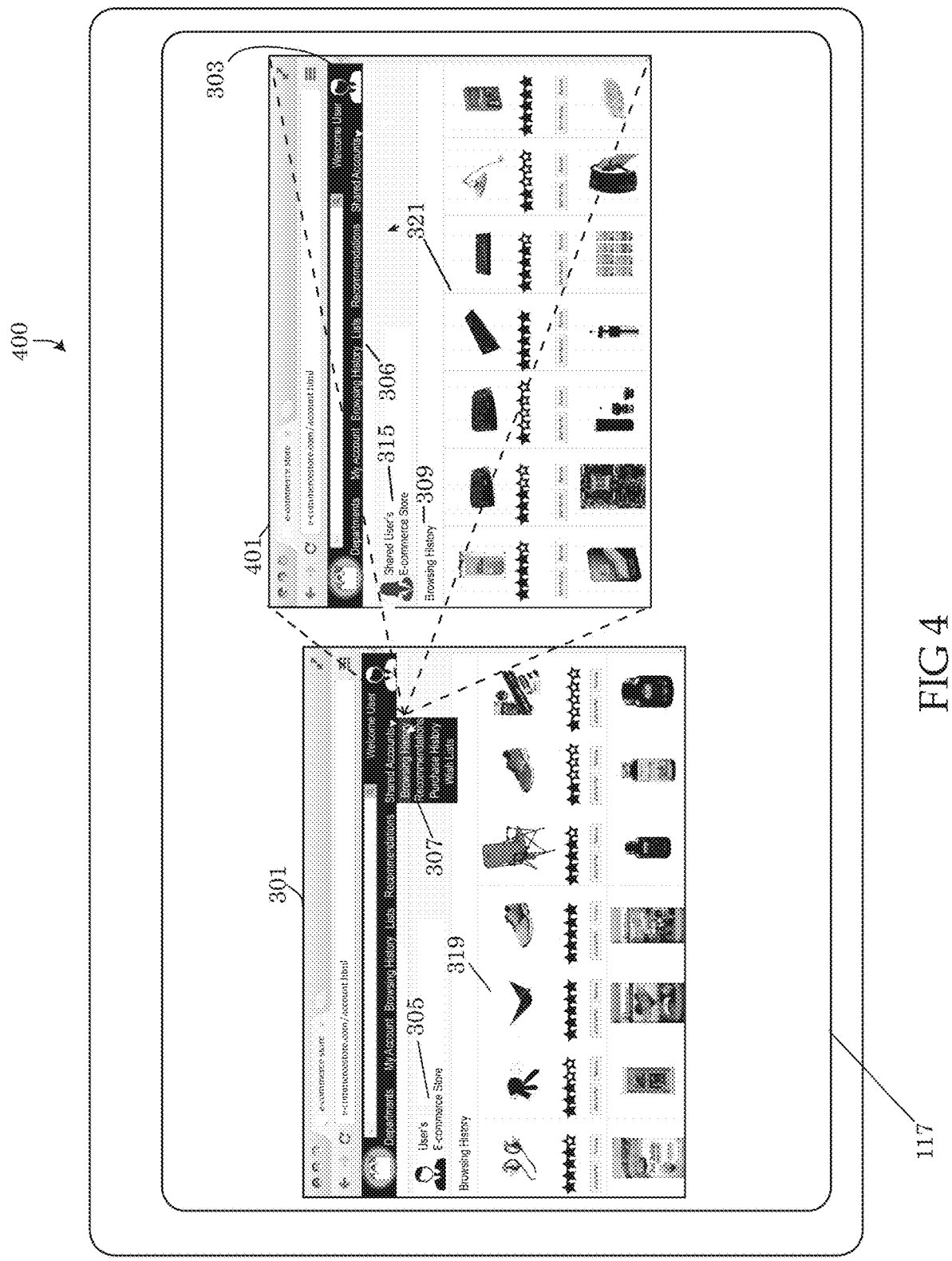
FIG. 4 depicts an alternative embodiment of an interface selectively access a shared account and displaying the shared account's content in a pop up window.

FIGS. 3a, 3b and 4 provide a visual example of an interface that may be displayed by an output device 117 of the computer system 101, consistent with embodiments of the disclosure described in this application. The interface may be presented in one or more windows 301 displaying the merchant's web page, service or application allowing selective access to a shared user account. As shown by the interface in embodiment 300, the interface may identify the current user 303 logged into the merchant. Embodiments of the interface may further include a plurality of user account menu options 306 for managing settings relating the current user's 303 account. While logged into the user's account, the interface in FIG. 3a may display a browsing history 309 of the current user 303. As shown by the interface, the user's content of the browsing history 309 is associated with a user identifier 305. The user identifier 305 indicates that the user content 319 being displayed within the interface associated with the current user 303 logged in to the merchant.

As shown in FIG. 3a, the interface of the merchant may further include a shared accounts subsection 307 for accessing the content of the sharing user, which may have a separate menu of options for accessing the shared user's content 121, 321. For example, in the embodiment 300, a current user 303, accessing a merchant, may select the shared accounts subsection 307 wherein the current user 303 may select options associated with the sharing user's personalized information, including but not limited to browsing history, recommendations of the merchant, purchase history and wish lists of the sharing user.

The embodiment of a merchant interface in FIG. 3b depicts the window 301 of a web browser accessing a shared user's browsing history 309 while logged in to the merchant as the current user 303. As shown in FIG. 3b, upon selecting the browsing history from the shared account menu 307 in FIG. 3a, the interface receives personalized information from the content management system 123 allowing for the interface to display the browsing history 309 of a sharing user. Embodiments of interface may identify to the current user 303 when information relating to a shared account are displayed. For example, in the interface of FIG. 3b, the browsing history 309 is specifically identified as being part of the shared user's e-commerce store front 315. The shared user's e-commerce store front 315 may specifically display the shared user's content 321 relating to products or services viewed by the sharing user while accessing the merchant. In this particular case, the shared user's browsing history.

Embodiments of the merchant interface being displayed may simultaneously allow for access to both user account menu options 306 and the shared user account menu options 307, allowing for the current user 303 to access both seamlessly from a single interface. Referring to embodiment 400 of FIG. 4, in some embodiments the current user 303 may select an option from the shared user account menu 307. Upon selecting an option from the shared user account menu 307, the shared content 321 may be presented in a separate window 401 having a shared user identifier 315 identifying the shared content 321 separately from the user's content 319.

Method for Selectively Accessing Content of a Shared Account

Figure 2:
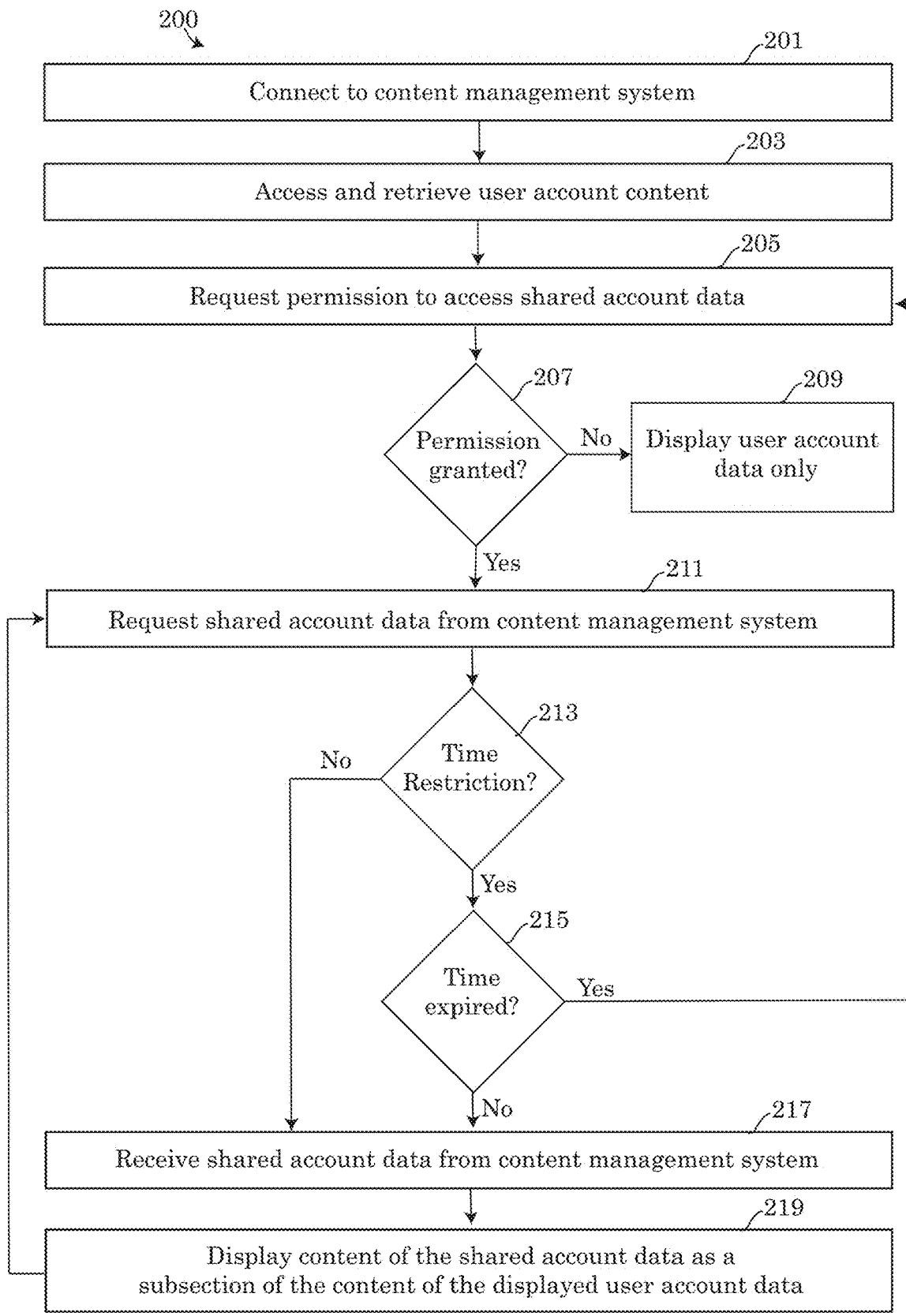
FIG. 2 depicts a flow chart of an embodiment of a method for selectively accessing a shared account.
Figure 5:
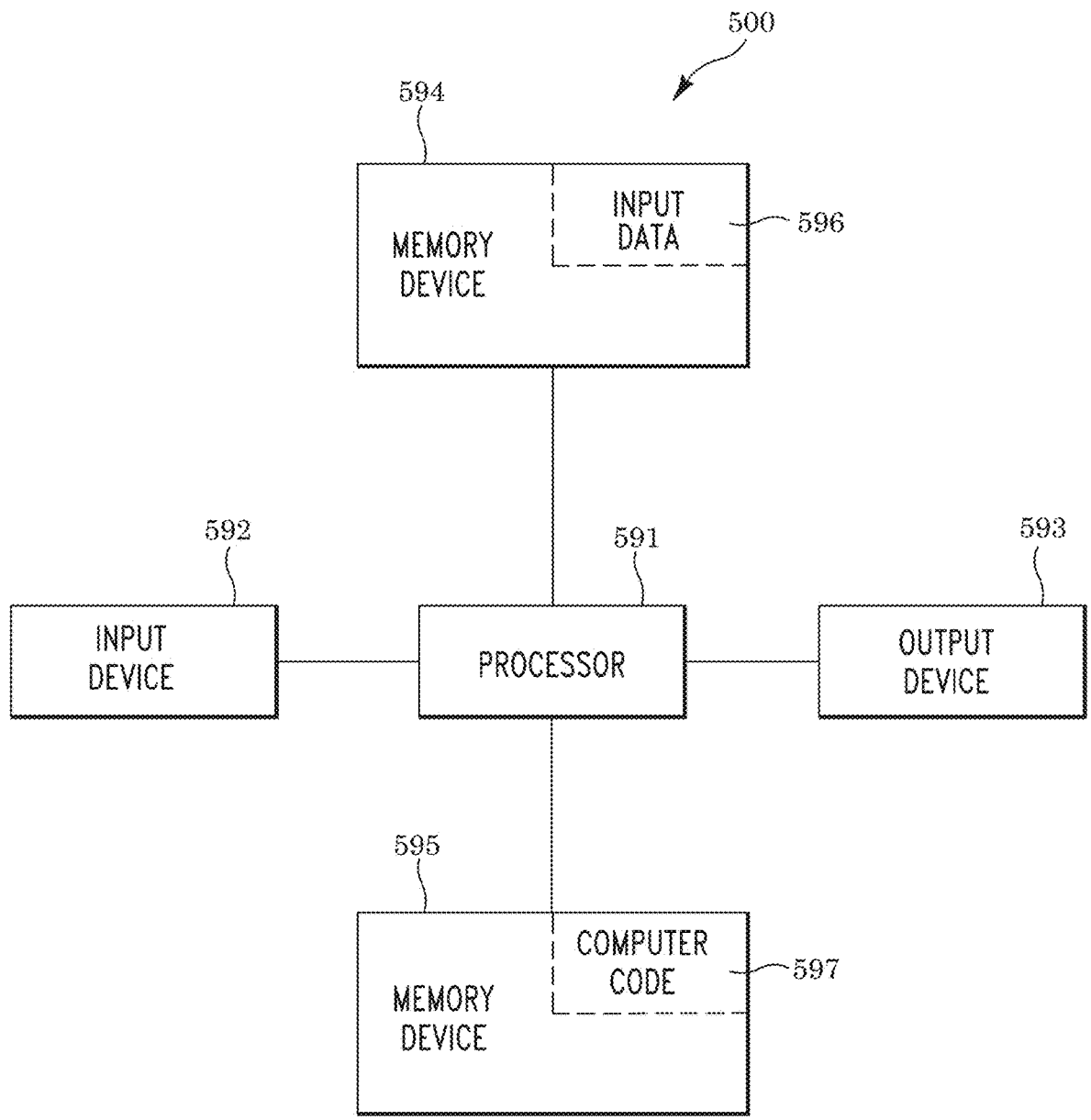
FIG. 5 illustrates a block diagram of an embodiment of a computer system capable of implementing methods for selectively accessing a shared account consistent with embodiments of the present disclosure.

The drawing of FIG. 2 represents one embodiment of a method 200 or algorithm that may be implemented for selectively accessing content of a shared account from a current account accessing a merchant or other website, application, service in accordance with the account sharing system of FIGS. 1, 3a, 3b and 4, using one or more computer systems defined generically in FIG. 5 to implement the specific embodiments of FIGS. 1, 3a, 3b and 4.

Embodiments of a method 200 for accessing a shared account from a current account may begin at step 201, whereby a user accessing a merchant's e-commerce website, application or service may connect via a network 106 to the content management system 123 of the merchant. As noted above, the content management system may be a physical hardware server or virtual software based server, responsible for distributing the content of the merchant's website, application or service to computer systems connecting to the merchant. In some embodiments, the computing system 101 connecting to the content management system 123 may be implemented to identify the user's credentials or authorization. For example, the profile module 105 of the account sharing module 103 may present credentials identifying the user's authorization to connect the content management system 123 as a particular user account profile.

Upon connecting to the content management system in step 201, the computer system 101 may, in step 203, access and retrieve content of the user's account corresponding to a user profile, which may be provided in some embodiments in the form of user account data. The user account data accessed and retrieved in step 203 may include personalized or customized data describing the user's previous interactions performed or inputted into the content management system 123 while connected to the content management system 123. Examples of the user account data that may be retrieved as user account data may include identifying information about the user such as name, billing address, shipping address, credit card or other payment methods, history of past orders, previously viewed products or services, bookmarked products or services for future purchases, search history, wish lists, reviews, and recommendations made by the merchant website, service or application.

In some embodiments, the method may in step 205 further comprise requesting permission to access shared account data associated with an account or profiled stored by the content management system 123 belonging to another user while simultaneously accessing the user's account or profile. Step 205 may be performed by the profile module 105 sending a service request to the content management system 123. The service request may, for example be made using an HTTP, HTTPS, TCIP, UDP, XML, P2P or other protocol known by an individual skilled in the art. In some embodiments, the request for permission may be authorized by the content management system directly. In other embodiments, the request may be forwarded to the sharing user whom the request is made to access the sharing user's account profile and personalized or customized information. In step 207, the sharing user may respond to the request and indicate to the content management system 123 whether the request made in step 205 should be granted or denied. If the sharing user denies the permission request in step 207, the content management system may deny the user request to access the shared account data. The computing system 101 may subsequently display the user's account information as user account content 119, 319 on an output device 117.

Conversely, if, at step 207 the request for permission to access shared account data in step 205 is granted, the content management module 109 of computer system 101 may, in step 211, request the content engine 125 of the content management system 123 to transmit shared account data stored by the content storage device 127 of the content management system 123 to the computer system 101. However, in some embodiments, the shared account data stored by the content management system 123 may only be accessible to the user account for a limited or predetermined length of time. At step 213 of the method for accessing shared account data, the system 100 may determine whether or not there is a time restriction imposed on the user account, limiting the amount of time the user account may request and receive shared account data. If, at step 213, there is not a time restriction, the method may proceed to step 217, allowing the computer system 101 to receive shared account data from the content management system 123.

However, if the system 100 and/or the content management system 123 of the merchant impose a time restriction, limiting the access by the user to the shared account data, the method may perform a further determination whether or not the allotted time for accessing the shared account data has expired in step 215. If, the time restriction imposed by the content management system 123 has expired, the computer system 101, via the profile module 105, may make another request for permission to access the shared account data per the method step 205 described above. On the other hand, so long as the allotted time restriction imposed by the content management system 123 is still valid, the computer system 101 may receive the shared account data from the content management system in step 213, including but not limited to shared account's order histories, browsing history, ratings/reviews, wish lists, bookmarked products or services, data reflecting the sharing user's liked products or services, proposed future purchases recommended by the content management system, or any other data that may suggest the personalized preferences of the sharing user.

After receiving the shared user account data from the content management system in step 217, the reporting module 107 may display the contents of the shared account data alongside the contents of user's own account data or display menu options allowing the user to access both the user's account data and the shared account data from a single interface. The shared content 121, 321 of the user account data may be displayed on an output device 117, such as a monitor or screen connected to the computer system 101, as a subsection of the user account content. For example, in some embodiments, the user of computer system 100 may be able to simultaneously view the user's own account content 119, 319 and the shared content within the same presentation window of a graphical user interface (GUI). In alternative embodiments, the user's account content may be displayed in step 219 in a separate window 301, 401 than the shared content of the sharing user's account data. While both windows 301, 401 may appear to be present at the same merchant website, application or service, the user account content 119, 319 may appear with the customized settings or information presented normally by the user's account. Whereas, the separate window 401 may display the shared content 121, 321 as a visual representation similar to the manner in which the sharing user would perceive the display of shared content. However, the separate window 401 comprising the shared account data is being retrieved and displayed to the user controlling the user account profile 303, instead of the sharing user themselves.

In an alternative embodiment, the display of shared account data may be presented as a separate widget element of the GUI. The shared user content 121 may appear in a manner similar to a display interface that would be presented to the sharing user when accessing the shared account data from the sharing user's account, however, the user account receiving the shared content 121, 321 may freely alternate between the display of shared content and the widget displaying the user account content.

Moreover, in some embodiments, the user accessing both the user account content 119, 319 and the shared content 121, 321, may select to make a purchase based on the shared content 121, 321, for example by viewing products or services displayed by the subsection, window or widget of the merchant web site, application or service. The user may proceed to select one or more products or services from the displayed shared content 121, 321 and purchase the products or services from the merchant as if the purchase was performed in the user account content window or widget. However, when making the purchases using the shared content being displayed in the share content's own subsection, window or widget, the merchant may accredit the purchase to the user account controlling the selection of products or services and making said selection of purchases in view of the shared account data.

Computer System

Referring to the drawings, FIG. 5 illustrates a block diagram of a computer system 500 that may be included in the system of FIG. 1 and for implementing methods for accessing content of a shared account as shown in the embodiment of FIG. 2 and in accordance with the embodiments of the present disclosure. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for tools and programs capable of accessing content of a shared account, in the manner prescribed by the embodiments of the disclosure using the systems of FIG. 1, wherein the instructions of the computer code 597 may be executed by processor 591 via memory device 595. The computer code 597 may include software or program instructions that may implement one or more algorithms for implementing the methods for accessing content of a shared account, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 1.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, sensors, biometric scanner, camera, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 200, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to accessing content of a shared account. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to access content of a shared account. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of accessing content of a shared account. Thus the present invention discloses a process for supporting, deploying and/or integrating computer infrastructure, integrating, hosting, maintaining, and deploying computer-readable code into the computer system 500, wherein the code in combination with the computer system 500 is capable of performing a method for accessing content of a shared account.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for accessing content of a shared account, said method comprising:
   accessing, by a processor of a computer system, a first account controlled by a first user;
   requesting, by the processor, permission for the first user to access the shared account controlled by a second user while the first user simultaneously accesses the first account controlled by the first user, wherein the first account and the shared account are each separate profiles of an e-commerce web-page, wherein the permission for the first user to access and display the shared account data is restricted to a predetermined time duration;
   receiving, by the processor, permission for the first user to access shared account data of the shared account;

in response to said receiving permission for the first user to access shared account data of the shared account, receiving, by the processor, the shared account data;

displaying in a graphical user interface (GUI), by the processor, first account data associated with the first account controlled by the first user and the shared account data of the shared account, wherein the shared account data is displayed in the GUI as a subsection of the first account controlled by the first user, and wherein the shared account data in the displayed subsection includes a browsing history of the second user, a search history of the second user, product reviews, or combinations thereof;

selecting a product or service, by the processor from the browsing history of the second user, the search history of the second user, or product reviews in the displayed subsection, for purchase by the first user from the e-commerce web page within the subsection, purchasing, by the processor, the product or service from the e-commerce web page; and accrediting, by the processor, the first account as the purchaser of the product or service.

2. The method of claim 1, wherein the shared account data displayed as a subsection of the first account includes purchase history, search history, wish lists, and reviews of content.

3. The method of claim 1, wherein the shared account data is a widget of the GUI navigable by the first user controlling the first account.

4. A computer system, comprising:
a processor;
a memory device coupled to the processor; and
a computer readable storage device coupled to the processor, wherein the storage device contains program code executable by the processor via the memory device to implement a method for accessing content of a shared account, said method comprising:
accessing, by the processor, a first account controlled by a first user;
requesting, by the processor, permission for the first user to access the shared account controlled by a second user while the first user simultaneously accesses the first account controlled by the first user, wherein the first account and the shared account are each separate profiles of an e-commerce web-page, wherein the permission for the first user to access and display the shared account data is restricted to a predetermined time duration;
receiving, by the processor, permission for the first user to access shared account data of the shared account;
in response to said receiving permission for the first user to access shared account data of the shared account, receiving, by the processor, the shared account data;
displaying in a graphical user interface (GUI), by the processor, first account data associated with the first account controlled by the first user and the shared account data of the shared account, wherein the shared account data is displayed in the GUI as a subsection of the first account controlled by the first user, and wherein the shared account data in the displayed subsection includes a browsing history of the second user, a search history of the second user, product reviews, or combinations thereof;
selecting a product or service, by the processor from the browsing history of the second user, the search history of the second user, or product reviews in the displayed subsection, for purchase by the first user from the e-commerce web page within the subsection,
purchasing, by the processor, the product or service from the e-commerce web page; and
accrediting, by the processor, the first account as the purchaser of the product or service.

5. The computer system of claim 4, wherein the shared account data displayed as a subsection of the first account includes purchase history, search history, wish lists, and reviews of content.

6. The computer system of claim 4, wherein the shared account data is a widget of the GUI navigable by the first user controlling the first account.

7. A computer program product comprising:
one or more computer readable hardware storage devices having computer readable program code stored therein, said program code containing instructions executable by a processor of a computer system to implement a method for accessing content of a shared account said method comprising:
accessing, by the processor, a first account controlled by a first user;
requesting, by the processor, permission for the first user to access the shared account controlled by a second user while the first user simultaneously accesses the first account controlled by the first user, wherein the first account and the shared account are each separate profiles of an e-commerce web-page, wherein the permission for the first user to access and display the shared account data is restricted to a predetermined length of time;
receiving, by the processor, permission for the first user to access shared account data of the shared account;
in response to said receiving permission for the first user to access shared account data of the shared account, receiving, by the processor, the shared account data;
displaying in a graphical user interface (GUI), by the processor, first account data associated with the first account controlled by the first user and the shared account data of the shared account, wherein the shared account data is displayed in the GUI as a subsection of the first account controlled by the first user, and wherein the shared account data in the displayed subsection includes a browsing history of the second user, a search history of the second user, product reviews, or combinations thereof;
selecting a product or service, by the processor from the browsing history of the second user, the search history of the second user, or product reviews in the displayed subsection, for purchase by the first user from the e-commerce web page within the subsection,
purchasing, by the processor, the product or service from the e-commerce web page; and
accrediting, by the processor, the first account as the purchaser of the product or service.

8. The computer program product of claim 7, wherein the shared account data displayed as a subsection of the first account includes purchase history, search history, wish lists, and reviews of content.

9. The computer program product of claim 7, wherein the shared account data is a widget of the GUI navigable by the first user controlling the first account.

* * * * *